United States Patent
Cui et al.

(10) Patent No.: US 10,313,936 B2
(45) Date of Patent: Jun. 4, 2019

(54) METHOD AND APPARATUS FOR ACCESSING BASE STATION

(71) Applicant: Beijing Xiaomi Mobile Software Co., Ltd., Beijing (CN)

(72) Inventors: Hengbin Cui, Beijing (CN); Long Sun, Beijing (CN); Qi Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 32 days.

(21) Appl. No.: 15/372,969

(22) Filed: Dec. 8, 2016

(65) Prior Publication Data

US 2017/0339608 A1 Nov. 23, 2017

(30) Foreign Application Priority Data

May 20, 2016 (CN) .......................... 2016 1 0341897

(51) Int. Cl.
*H04W 36/00* (2009.01)
*H04B 17/318* (2015.01)
(Continued)

(52) U.S. Cl.
CPC ...... *H04W 36/0083* (2013.01); *H04B 17/318* (2015.01); *H04W 12/08* (2013.01);
(Continued)

(58) Field of Classification Search
CPC . H04W 36/0083; H04W 12/08; H04W 12/12; H04W 48/20; H04W 12/06; H04W 36/0005; H04W 48/02; H04B 17/318
(Continued)

(56) References Cited

U.S. PATENT DOCUMENTS

| 5,794,149 A | * | 8/1998 | Hoo | ...... H04W 36/30 455/433 |
| 6,035,041 A | * | 3/2000 | Frankel | ...... H04L 9/302 380/28 |

(Continued)

FOREIGN PATENT DOCUMENTS

| CN | 104780529 A | 7/2015 |
| CN | 105451232 A | 3/2016 |

(Continued)

OTHER PUBLICATIONS

ETSI, "LTE; Evolved Universal Terrestrial Radio Access (E-UTRA); Radio Resource Control (RRC); Protocol specification (3GPP TS 36.331 version 8.2.0 Release 8)", Nov. 2008, ETSI, 3GPP TS 36.331 version 8.2.0 Release 8, pp. 18-37, 60-91 (Year: 2008).*

(Continued)

*Primary Examiner* — Un C Cho
*Assistant Examiner* — Shah M Rahman
(74) *Attorney, Agent, or Firm* — Finnegan, Henderson, Farabow, Garrett & Dunner LLP

(57) ABSTRACT

A method for accessing a base station is provided. The method includes: identifying, by a terminal device, a target base station providing a maximum received signal strength from at least one base station; receiving a system message sent by the target base station, the system message including an access parameter associated with the target base station; if a value of the access parameter satisfies a preset condition, accessing the target base station; and if the value of the access parameter does not satisfy the preset condition, maintaining access to a base station currently accessed by the terminal device.

7 Claims, 6 Drawing Sheets

(51) Int. Cl.
*H04W 12/08* (2009.01)
*H04W 48/20* (2009.01)
*H04W 12/12* (2009.01)
*H04W 12/06* (2009.01)

(52) U.S. Cl.
CPC ........... *H04W 12/12* (2013.01); *H04W 48/20* (2013.01); *H04W 12/06* (2013.01)

(58) Field of Classification Search
USPC ........................................................ 370/331
See application file for complete search history.

(56) References Cited

U.S. PATENT DOCUMENTS

| | | | | |
|---|---|---|---|---|
| 7,940,727 | B2* | 5/2011 | Kim | H04W 36/0083 370/332 |
| 9,319,941 | B2* | 4/2016 | Bonneville | H04W 36/0005 |
| 2004/0236619 | A1* | 11/2004 | Gundersen | G06Q 10/04 705/7.15 |
| 2006/0084432 | A1* | 4/2006 | Balasubramanian | H04W 74/004 455/434 |
| 2007/0049323 | A1 | 3/2007 | Wang et al. | |
| 2007/0079376 | A1 | 4/2007 | Robert et al. | |
| 2009/0104889 | A1* | 4/2009 | Lotvonen | H04L 63/1441 455/410 |
| 2009/0303040 | A1* | 12/2009 | Srinivasa | G08B 13/248 340/540 |
| 2010/0227611 | A1* | 9/2010 | Schmidt | H04W 4/06 455/434 |
| 2012/0096519 | A1 | 4/2012 | Alanara et al. | |
| 2012/0202557 | A1* | 8/2012 | Olofsson | H04W 24/08 455/525 |
| 2013/0065516 | A1 | 3/2013 | Asaoka | |
| 2013/0260768 | A1* | 10/2013 | Guo | H04W 36/0055 455/438 |
| 2014/0056220 | A1* | 2/2014 | Poitau | H04W 76/14 370/328 |
| 2014/0112182 | A1* | 4/2014 | Ljung | H04W 24/10 370/252 |
| 2014/0304783 | A1* | 10/2014 | Fujiwara | H04W 12/12 726/4 |
| 2015/0139195 | A1* | 5/2015 | Xiao | H04W 36/22 370/332 |
| 2015/0264571 | A1* | 9/2015 | Filippi | H04L 63/0272 726/4 |
| 2016/0198377 | A1* | 7/2016 | Centonza | H04W 36/0083 370/331 |
| 2016/0242111 | A1* | 8/2016 | Wakabayashi | H04W 4/70 |
| 2017/0019820 | A1* | 1/2017 | Das | H04W 36/0016 |
| 2017/0078922 | A1* | 3/2017 | Raleigh | H04W 28/10 |

FOREIGN PATENT DOCUMENTS

| | | |
|---|---|---|
| CN | 105554764 A | 5/2016 |
| EP | 2003818 A1 | 12/2008 |
| EP | 2661113 A1 | 11/2013 |
| JP | 2010263310 A | 11/2010 |
| JP | 2014090255 A | 5/2014 |
| JP | 2016086331 A | 5/2016 |
| KR | 1020120138792 | 12/2012 |
| RU | 2546610 C1 | 4/2015 |

OTHER PUBLICATIONS

ETSI, "LTE; Evolved Universal Terrestrial Radio Access (E-UTRA); Radio Resource Control (RRC); Protocol specification (3GPP TS 36.331 version 10.1.0 Release 10)", 2011-14, ETSI, 3GPP TS 36.331 version 10.1.0 Release 10, pp. 24-57, 110-160 (Year: 2011).*
International Search Report for International Application No. PCT/CN2016/094343, dated Feb. 8, 2017, 4 pages.
Extended European Search Report from European Patent Office for European Application No. 16200421.2, dated May 31, 2017, 10 pages.
English version of International Search Report for International Application No. PCT/CN2016/094343, dated Feb. 8, 2017, 2 pages.

* cited by examiner

METHOD AND APPARATUS FOR ACCESSING BASE STATION

CROSS-REFERENCE TO RELATED APPLICATION

This application is based upon and claims priority to Chinese Patent Application No. 201610341897.3, filed May 20, 2016, the entire contents of which are incorporated herein by reference.

TECHNICAL FIELD

The present disclosure generally relates to the field of computer technology and, more particularly, to a method and apparatus for accessing a base station.

BACKGROUND

During operation of a mobile terminal, the mobile terminal may periodically detect received signal strength of a plurality of base stations that can be accessed, and determine whether the received signal strength of the currently accessed base station is the maximum among the plurality of base stations. If the received signal strength of the currently accessed base station is the maximum among the plurality of base stations, the mobile terminal may maintain access to the currently accessed base station; otherwise, the mobile terminal may perform a process to access the base station having the maximum received signal strength. Thus, the mobile terminal may access the base station having the maximum received signal strength, and the communication quality may be maintained.

However, a counterfeit base station may exist sometimes. Within a certain range, the received signal strength of the counterfeit base station may be greater than that of a genuine base station. As a result, the mobile terminal may access the counterfeit base station, and then the counterfeit base station may send a scam text message to the accessed mobile terminal to obtain illegal gains.

SUMMARY

According to a first aspect of the present disclosure, there is provided a method for accessing a base station, comprising: identifying, by a terminal device, a target base station providing a maximum received signal strength from at least one base station; receiving a system message sent by the target base station, the system message including an access parameter associated with the target base station; if a value of the access parameter satisfies a preset condition, accessing the target base station; and if the value of the access parameter does not satisfy the preset condition, maintaining access to a base station currently accessed by the terminal device.

According to a second aspect of the present disclosure, there is provided an apparatus for accessing a base station, comprising: a processor; and a memory for storing instructions executable by the processor. The processor is configured to: identify a target base station providing a maximum received signal strength from at least one base station; receive a system message sent by the target base station, the system message including an access parameter associated with the target base station; if a value of the access parameter satisfies a preset condition, access the target base station; and if the value of the access parameter does not satisfy the preset condition, maintain access to a base station currently accessed by the apparatus.

According to a third aspect of the present disclosure, there is provided a non-transitory readable storage medium storing instructions that, when executed by a processor in a terminal device, cause the terminal device to perform a method for accessing a base station, the method comprising: identifying, from at least one base station, a target base station providing a maximum received signal strength to the terminal device; receiving a system message sent by the target base station, the system message including an access parameter associated with the target base station; if the value of the access parameter satisfies a preset condition, accessing the target base station; and if the value of the access parameter does not satisfy the preset condition, maintaining access to a base station currently accessed by the terminal device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure include a method for accessing a base station, where the method may be performed by a terminal device. The terminal device may be a mobile terminal, such as a mobile phone or a tablet computer. The terminal device may include a transceiver, a processor and a memory. The transceiver may be configured to detect a signal sent by a base station, and receive a system message sent by the base station. The system message may include a value of an access parameter associated with the base station. The processor may be configured to identify a base station from which the terminal device receives a maximum signal strength, and determine whether the value of the access parameter received by the transceiver satisfies a preset condition. If the value of the access parameter satisfies the preset condition, the identified base station may be accessed; and if not, access to the current base station may be maintained. The memory may be configured to store the preset condition associated with the access parameter for accessing a base station, as well as data received or generated during the above described procedure.

Figure 1:
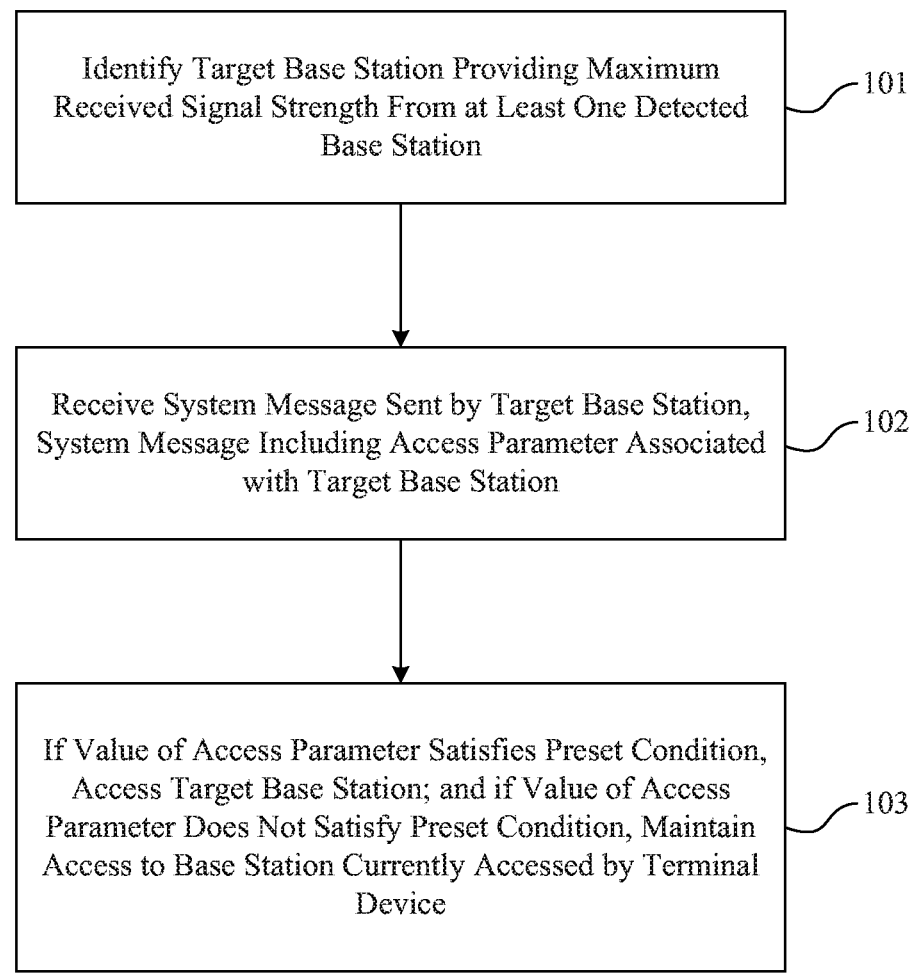
FIG. 1 is a flowchart of a method for accessing a base station, according to an exemplary embodiment.

FIG. 1 is a flowchart of a method 100 for accessing a base station, according to an exemplary embodiment. For example, the method 100 may be performed by a terminal device. Referring to FIG. 1, the method 100 may include the following steps.

In step 101, the terminal device identifies a target base station providing a maximum received signal strength from at least one detected base station.

For example, the terminal device may detect signals sent by surrounding base stations and may determine signal strength of the detected signals of respective base stations. The number of the detected base stations may be one or more. The terminal device may detect the signal strength of the surrounding base stations in real time, or may detect the signal strength of the surrounding base stations periodically with a preset detection interval. The terminal device may determine the maximum signal strength from the detected signal strength of multiple base stations, and then may determine the corresponding base station as the target base station.

In some embodiments, the terminal device may be provided with a list of one or more prohibited base stations. Accordingly, the terminal device may identify a target base station providing a maximum received signal strength from at least one detected base station that is not included in the pre-stored list of prohibited base stations.

For example, the terminal device may store the list of prohibited base stations in advance, and the list of prohibited base stations may include one or more identifications of insecure base stations. After detecting signals sent by surrounding base stations, the terminal device may compare the base stations sending the signals with those stored in the list of prohibited base station, so as to determine whether a base station sending the signals is included in the list of prohibited base stations. If such a base station exists, the terminal device may identify, among the detected base stations, one or more base stations outside the list of prohibited base stations, and then identify the target base station providing the maximum received signal strength from the one or more base stations. If such a base station does not exist, the terminal device may identify, among the detected base stations, the target base station providing the maximum received signal strength.

In step 102, the terminal device receives a system message sent by the target base station, the system message including an access parameter associated with the target base station.

For example, frequency bands of signals sent by different base stations may be different. After determining the target base station providing the maximum received signal strength, the terminal device may adjust a receiving frequency band of a local transceiver based on the frequency band of the target base station, such that the terminal device may receive the system message sent by the target base station. The system message may include various parameters, such as a System Information Block Type 1 (SIB1), a System Information Block Type 2 (SIB2), and a System Information Block Type 3 (SIB3). In some embodiments, the access parameter may include one or more parameters contained in the SIB3, such as a minimum access level, reselected offset information, an update period, a General Packet Radio Service (GPRS) supporting status, and a Location Area Code (LAC) identification. The access parameter may also include other parameters in the system message, which is not limited by the present disclosure. After receiving the system message sent by the target base station, the terminal device may parse the system message and obtain the access parameter in the system message.

In step 103, if the value of the access parameter satisfies a preset condition, the terminal device accesses the target base station; and if the value of the access parameter does not satisfy the preset condition, the terminal device maintains access to the base station currently accessed by the terminal device.

For example, after obtaining the value of the access parameter in the system message, the terminal device may determine whether the value of the access parameter satisfies the preset condition of a secure base station. If the terminal device determines that the value of the access parameter satisfies the preset condition of a secure base station, the terminal device may access the target base station. If the terminal device determines that the value of the access parameter does not satisfy the preset condition, the terminal device continues to access the currently accessed base station. In some implementations, the terminal device may store a range of access parameter value of secure base station in advance, and determine whether the received value of the access parameter is within the range of access parameter value. If the received value of the access parameter is within the range of access parameter value, the terminal device may determine that the value of the access parameter satisfies the preset condition; otherwise, the terminal device may determine that the value of the access parameter does not satisfy the preset condition of secure base station. In some implementations, the system message may include multiple access parameters, and ranges of access parameter value corresponding to respective access parameters may be stored. The terminal device may determine whether received values of the access parameters are within the corresponding ranges of access parameter value. respectively. For example, the range of access parameter value corresponding to the minimum access level may be set as 50 db~120 db. If the received minimum access level is not within this range, it may be determined that the received minimum access level does not satisfy the preset condition.

In some embodiments, the terminal device may determine whether to access the target base station according to a security factor corresponding to the target base station. For example, the terminal device may determine a security factor corresponding to the target base station according to a matching degree between the value of the access parameter and the pre-stored reference value of a secure base station. If the security factor is less than a preset threshold value, the terminal device may access the target base station; and if the security factor is not less than the preset threshold value, the terminal device may maintain access to the current base station.

In some embodiments, the terminal device may determine a matching degree between the value of the access parameter and the pre-stored reference value of secure base station, and then determine the security factor corresponding to the target base station based on the matching degree. For example, where there are multiple access parameters, the terminal device may respectively determine the matching degree between each access parameter and the corresponding reference value, and then may determine the number of the access parameters whose corresponding matching degrees do not satisfy the preset matching condition. The terminal device may store a corresponding relationship between the number of the access parameters not satisfying the preset matching condition and the security factor in advance, and then may look up the corresponding security factor based on the determined number, where a relatively great number may correspond to a relatively great security factor. After determining the security factor corresponding to the target base station, the terminal device may compare the security factor with the preset threshold value which is stored in advance. If the security factor is less than the preset threshold value, the terminal device may access the target base station; and if the security factor is not less than the preset threshold value, the current base station may be maintained to be accessed.

In some embodiments, the terminal device may acquire pre-stored reference values of respective access parameters of a secure base station and determine a matching degree between the value of each access parameter included in the system message and the corresponding reference value. The terminal device may determine an adjustment value corresponding to each access parameter according to the pre-stored relationship between the matching degree and the adjustment value. The terminal device may determine a sum value of a pre-stored initial value and the adjustment value corresponding to each access parameter, so as to obtain the security factor corresponding to the target base station.

In some embodiments, there are multiple access parameters, and the terminal device may pre-store reference values of respective access parameters of a secure base station. The terminal device may determine the matching degree between the value of each access parameter and the corresponding reference value, and then may determine the adjustment value corresponding to each access parameter based on the pre-stored corresponding relationship between the matching degree and the adjustment value.

In some embodiments, the terminal device may determine whether the received parameter value is the same as the reference value. If they are the same, it may be determined that the matching degree between the value of the access parameter and the pre-stored reference value of a secure base station is a first matching degree (i.e., they are matched); otherwise, it may be determined that the matching degree is a second matching degree (i.e., they are not matched). For example, for the GPRS supporting status, the reference value may be set as GPRS supported, and the terminal device may determine whether the value of the received GPRS supporting status indicates GPRS supported. For another example, as to the LAC identification, the reference value may be set as a LAC identification sent by the currently accessed base station, then the terminal device may determine whether the received LAC identification is the same as the pre-stored LAC identification.

In some embodiments, the terminal device may also, based on a difference value between the received parameter value and the reference value, determine the matching degree. For example, as to the update period, the reference value may be set as 1 h. If the received update period is less than the reference value, and the difference value is greater than a preset first difference threshold value, such as 30 min, then it is determined that the matching degree between the received update period and the corresponding reference value is the second matching degree (i.e., they are not matched). For another example, as to the reselection offset information, the reference value may be set as 55 m. If the received reselection offset information is greater than the reference value, i.e., the difference value is positive, it is determined that the matching degree between the received reselection offset information and the reference value corresponding to the reselection offset information is the second matching degree (i.e., they are not matched).

In some embodiments, for a certain access parameter, a plurality of difference threshold values may be set. The terminal device may determine a mismatching degree according to the determined difference value and the plurality of difference threshold values. The greater the mismatching degree is, the greater the corresponding adjustment value is; and the smaller the mismatching degree is, the smaller the corresponding adjustment value is. For example, the reference value corresponding to the minimum access level is 50 db, the difference threshold values are 0 and 20 db. If the received minimum access level is less than 50 db, and an absolute value of the difference value with 50 db is less than 20 db, then it may be determined that the matching degree therebetween is a third matching degree (i.e., the mismatching degree is relatively low), and the corresponding adjustment value is determined to be 3 according to a preset corresponding relationship. If the received minimum access level is less than 50 db, and an absolute value of the difference value with 50 db is greater than 20 db, then it may be determined that the matching degree therebetween is a fourth matching degree (i.e., the mismatching degree is relatively high), and the corresponding adjustment value is determined to be 5 according to the preset corresponding relationship.

In some embodiments, the terminal device may also determine whether the received access parameter is consistent with the pre-stored access parameter of a secure base station. For example, as to the access parameter "inter-system reselection configuration information instruction", the access parameter of a secure base station generally includes this parameter, and if the received access parameter does not contain the inter-system reselection configuration information instruction, it may be determined that they are not matched.

After determining the adjustment value corresponding to each access parameter, the terminal device may add the pre-stored initial value to the adjustment value corresponding to each access parameter, so as to obtain the security factor corresponding to the target base station.

For example, assuming the reference value corresponding to the GPRS supporting status is set as GPRS supported, if the received GPRS supporting status is GPRS supported, then it may be determined that the corresponding adjustment value is 0. If the received GPRS supporting status is GPRS unsupported, then it may be determined that the corresponding adjustment value is 5. Assuming the reference value corresponding to the update period is set as 1 h, if the received update period is smaller than the access parameter reference value and the difference value is greater than 30 min, then it may be determined that the corresponding adjustment value is 5. For the inter-system reselection configuration information instruction, if the received system message does not contain the inter-system reselection configuration information instruction, then it may be determined that the corresponding adjustment value is 5. Assuming the initial value is set to 5, the received minimum access level is set to 10 db, the GPRS supporting status is set to GPRS unsupported, and the update period is set to 10 min, then it may be determined that an adjustment value is 5+5+5+5=20, and the security factor corresponding to the target base station is 5+20=25.

After determining the security factor corresponding to the target base station, the terminal device may compare the security factor with the pre-stored preset threshold value. If the security factor is smaller than the preset threshold value, the terminal device may access the target base station; and if the security factor is not smaller than the preset threshold value, the terminal device may maintain to access the currently belonged base station.

In some embodiments, if the terminal device determines that the value of the access parameter does not satisfy the preset condition, the terminal device may add the target base station into the list of prohibited base stations, so as to prevent the terminal device from receiving the message sent by the target base station again.

In some implementations, the terminal device may store the list of prohibited base stations in advance, and the list of prohibited base station may include an identification of an insecure base station. For the base station contained in the list of prohibited base stations, the terminal device may not receive the message sent by such base station. If the terminal device determines that the value of the access parameter of the target base station does not satisfy the preset condition, it indicates that the target base station may be an insecure base station, then the terminal device may add the target base station into the list of prohibited base stations. Thus, the terminal device would not receive the system message sent by the insecure base station later or access the insecure base station. In doing so, the scam text message sent by the counterfeit base station would not be received by the terminal device, thereby improving the user security.

Figure 2:
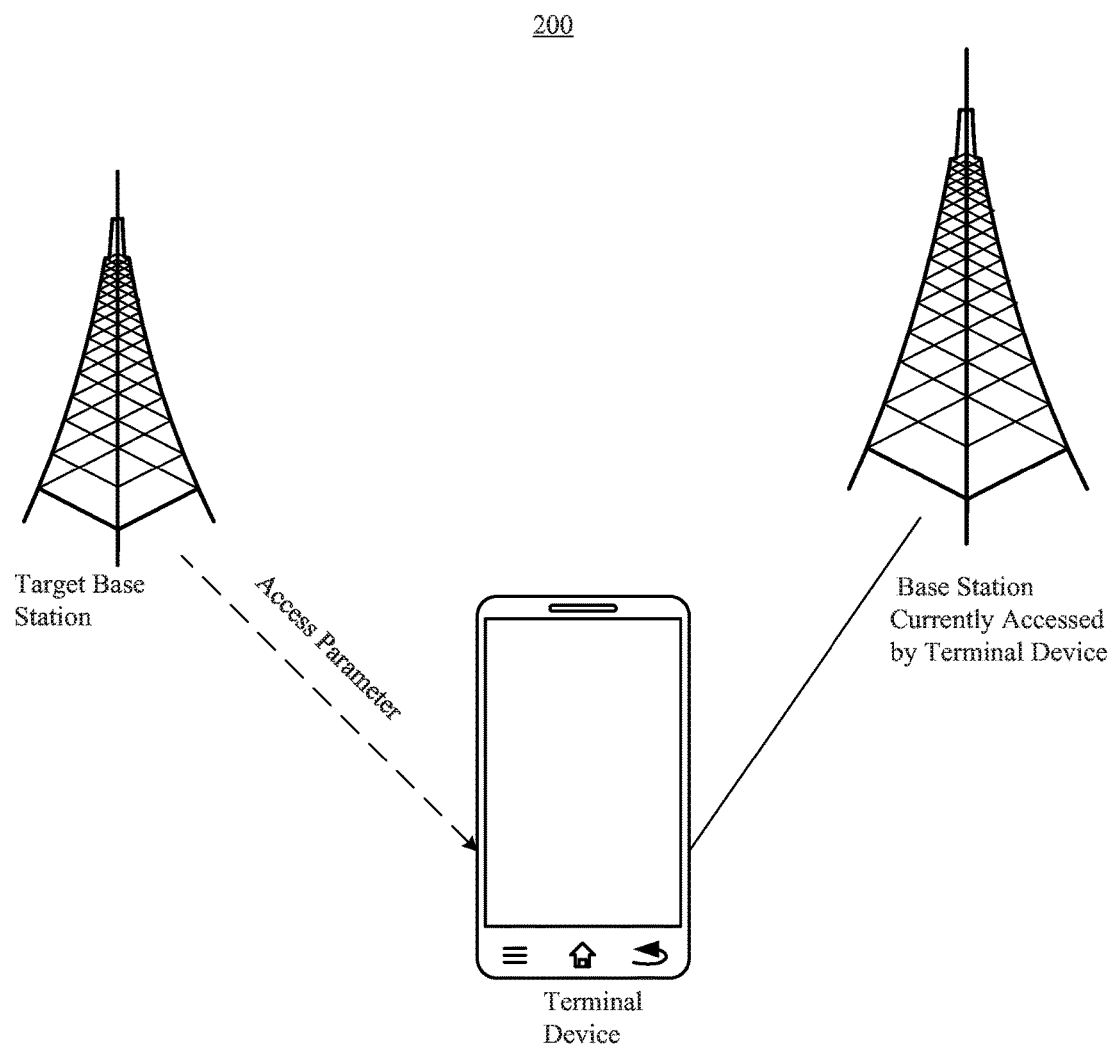
FIG. 2 is a schematic diagram showing a system environment, according to an exemplary embodiment.

FIG. 2 is a schematic diagram showing a system environment 200, according to an exemplary embodiment. As shown in FIG. 2, the system environment 200 includes a terminal device, a base station the terminal device currently accesses, and a target base station that provides a maximum received signal strength for the terminal device. The method 100 described in connection with FIG. 1 may be implemented in the illustrated system environment 200. For example, the terminal device may detect the value of the access parameter in the system message sent from the target base station and determine whether to access the target base station based on the value of the access parameter.

Figure 3:
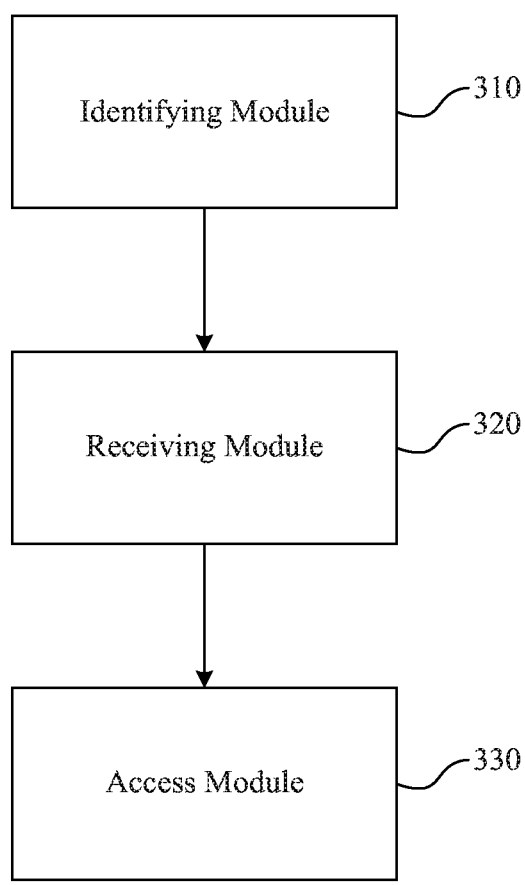
FIG. 3 is a block diagram of an apparatus for accessing a base station, according to an exemplary embodiment.

FIG. 3 is a block diagram of an apparatus 300 for accessing a base station, according to an exemplary embodiment. For example, the apparatus 300 may be implemented as a part of a terminal device. Referring to FIG. 3, the apparatus 300 includes an identifying module 310, a receiving module 320, and an access module 330.

The identifying module 310 is configured to identify, from at least one detected base station, a target base station providing a maximum received signal strength to the terminal device.

The receiving module 320 is configured to receive a system message sent by the target base station, the system message including an access parameter associated with the target base station.

The access module 330 is configured to, if the value of the access parameter satisfies a preset condition, access the target base station; and if the value of the access parameter does not satisfy the preset condition, maintain to access the base station currently accessed by the terminal device.

In some embodiments, the access module 330 is further configured to determine a security factor corresponding to the target base station according to a matching degree between the value of the access parameter and a pre-stored reference value of a secure base station. If the security factor is less than a preset threshold value, the access module 330 is configured to access the target base station; and if the security factor is not less than the preset threshold value, the access module 330 is configured to maintain access to the currently belonged base station.

Figure 4:
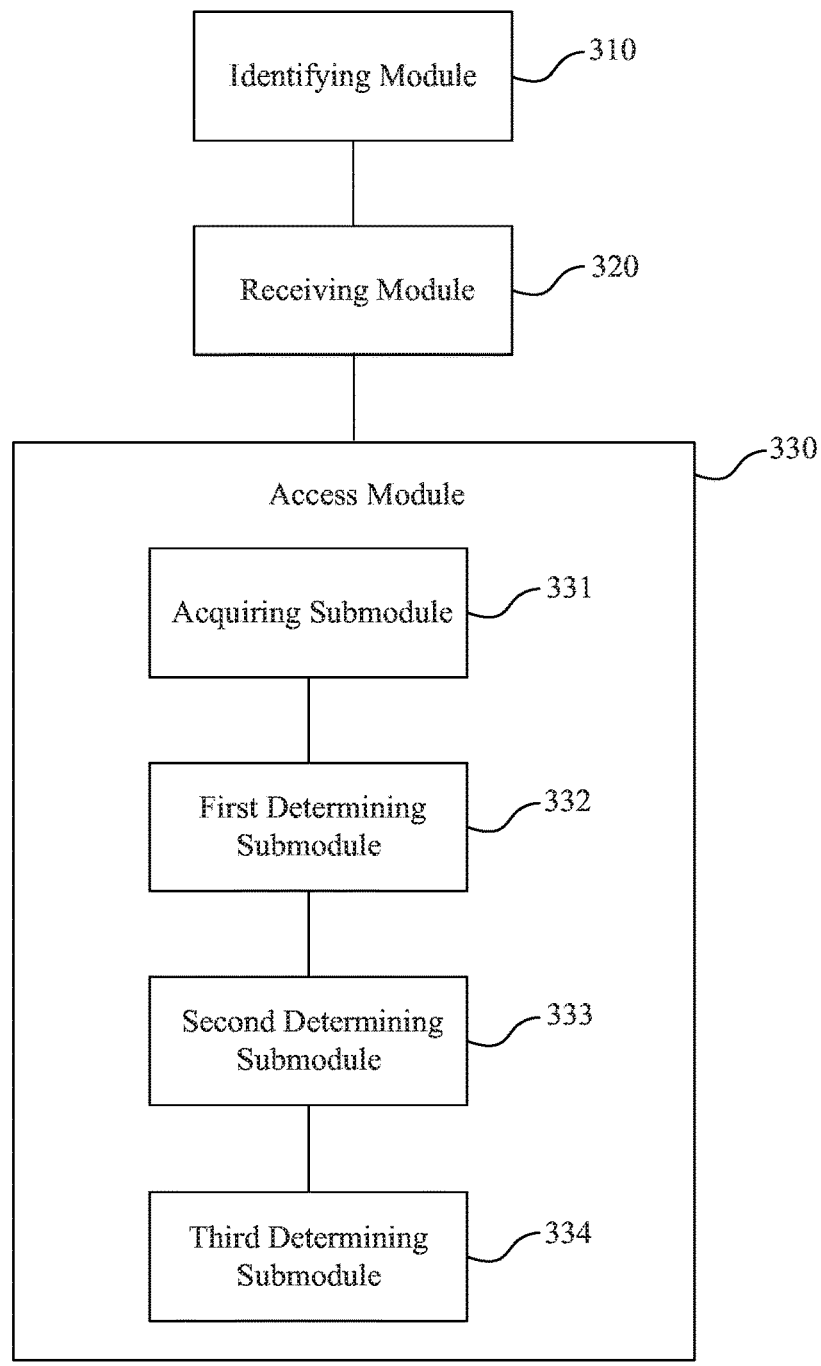
FIG. 4 is a block diagram of an apparatus for accessing a base station, according to an exemplary embodiment.

FIG. 4 is a block diagram of an apparatus 400 for accessing a base station, according to an exemplary embodiment. For example, the apparatus 400 may be implemented as a part of a terminal device. Referring to FIG. 4, the access module 330 includes an acquiring submodule 331, a first determining submodule 332, a second determining submodule 333, and a third determining submodule 334.

The acquiring submodule 331 is configured to acquire pre-stored reference values of respective access parameters of a secure base station.

The first determining submodule 332 is configured to determine a matching degree between the value of each access parameter included in the system message and a corresponding reference value.

The second determining submodule 333 is configured to determine an adjustment value corresponding to each access parameter according to a pre-stored corresponding relationship between the matching degree and the adjustment value.

The third determining submodule 334 is configured to determine a sum value of a pre-stored initial value and the adjustment value corresponding to each access parameter, so as to obtain the security factor corresponding to the target base station.

Figure 5:
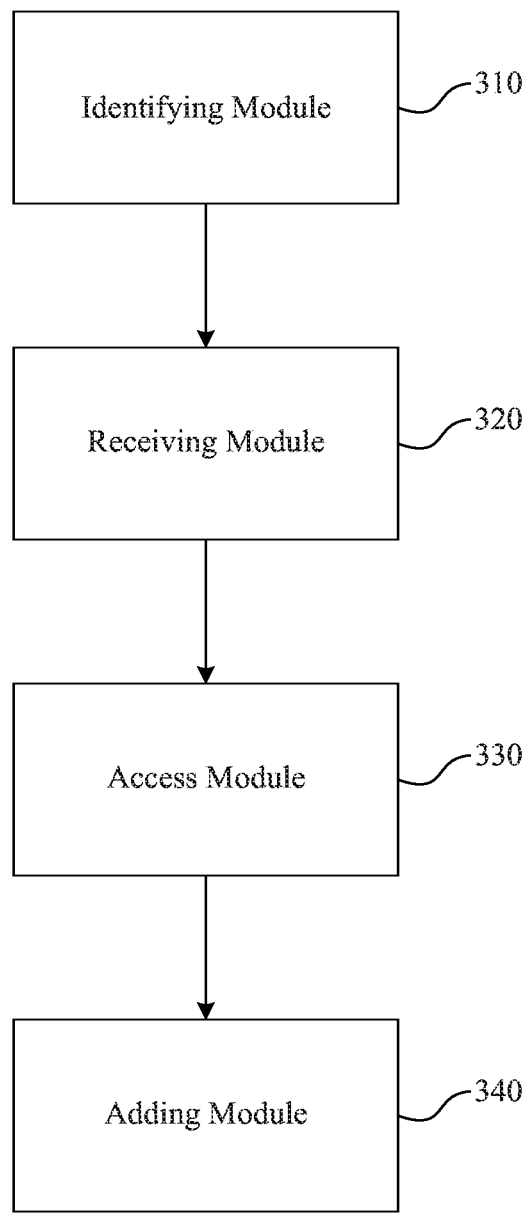
FIG. 5 is a block diagram of an apparatus for accessing a base station, according to an exemplary embodiment.

FIG. 5 is a block diagram of an apparatus 500 for accessing a base station, according to an exemplary embodiment. For example, the apparatus 500 may be implemented as a part of a terminal device. Referring to FIG. 5, the apparatus 500 further includes an adding module 340.

The identifying module 310 is further configured to identify the target base station providing the maximum received signal strength from at least one currently detected base station that is not included in a pre-stored list of one or more prohibited base stations.

The adding module 340 is configured to, when the value of the access parameter does not satisfy the preset condition, add the target base station into the list of prohibited base stations.

In some embodiments, the access parameter includes one or more of a minimum access level, reselection offset information, an update period, a GPRS supporting status, and a LAC identification.

Figure 6:
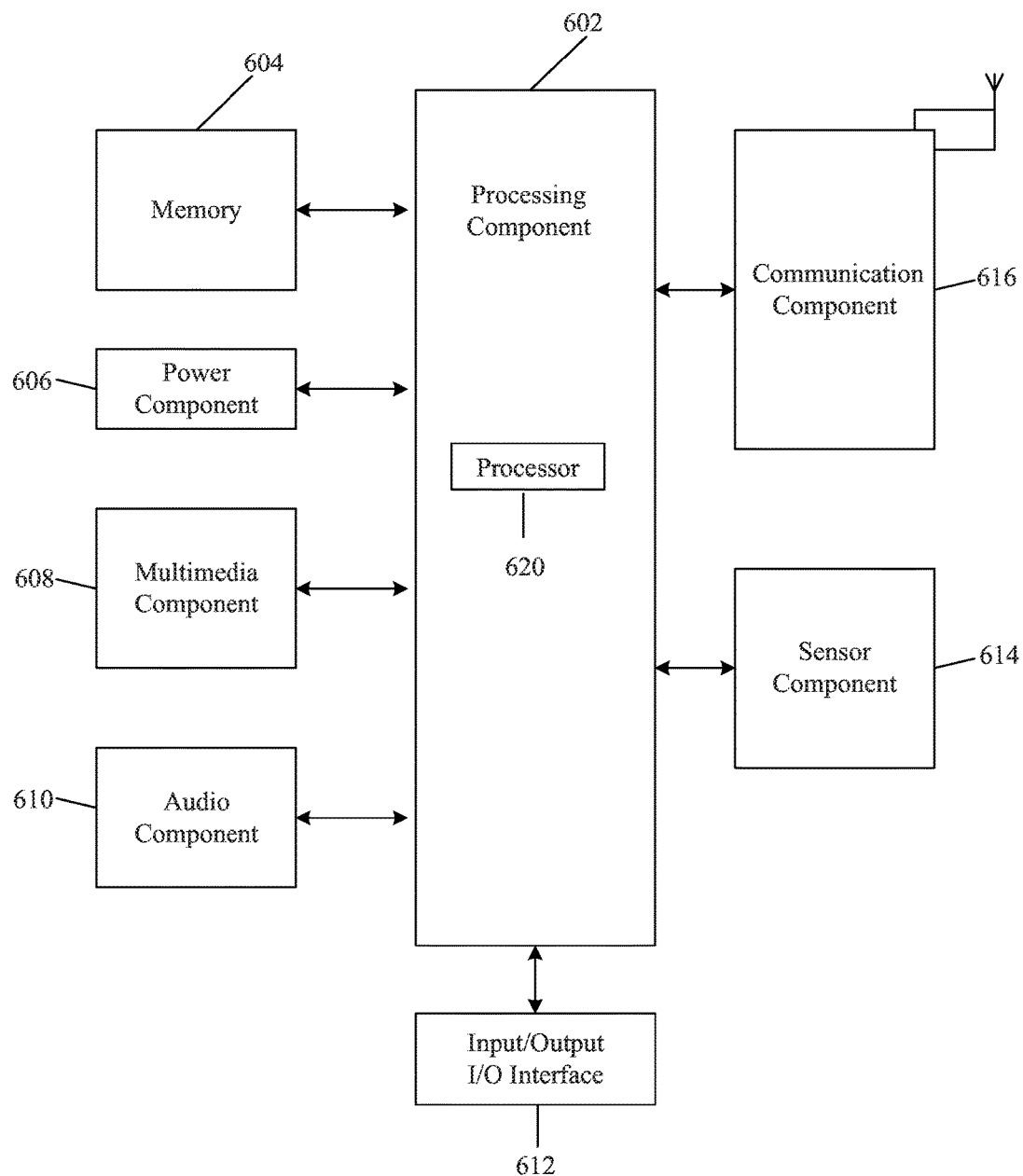
FIG. 6 is a block diagram of a terminal device, according to an exemplary embodiment.

FIG. 6 is a block diagram of a terminal device 600, according to an exemplary embodiment. For example, the terminal device 600 may be a mobile phone, a tablet computer, or the like.

Referring to FIG. 6, the terminal device 600 may include one or more of the following components: a processing component 602, a memory 604, a power component 606, a multimedia component 608, an audio component 610, an input/output (I/O) interface 612, a sensor component 614, and a communication component 616. The person skilled in the art should appreciate that the structure of the terminal device 600 as shown in FIG. 6 does not intend to limit the terminal device 600. The terminal device 600 may include more or less components or combine some components or other components.

The processing component 602 typically controls overall operations of the terminal device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the terminal device 600. The processing component 602 performs various functions and data processing by operating programs and modules stored in the memory 604. Examples of such data include instructions for any applications or methods operated on the terminal device 600, contact data, phonebook data, messages, pictures, videos, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 is configured to provide power to various components of the terminal device 600. The power component 606 may include a power management system, one or more power sources, and/or any other components associated with the generation, management, and distribution of power in the terminal device 600.

The multimedia component 608 includes a screen providing an output interface between the terminal device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the terminal device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 may include a microphone configured to receive an external audio signal when the terminal device 600 is in an operation mode, such as a call mode, a recording mode, and/or a voice recognition mode. The received audio signal may be further stored in the memory 604 or transmitted via the communication component 616.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the terminal device 600. For instance, the sensor component 614 may detect an on/off status of the terminal device 600, relative positioning of components, e.g., the display and the keypad, of the terminal device 600, a change in position of the terminal device 600 or a component of the terminal device 600, a presence or absence of user contact with the terminal device 600, an orientation or an acceleration/deceleration of the terminal device 600, and/or a change in temperature of the terminal device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the terminal device 600 and other devices. The terminal device 600 can access a wireless network based on a communication standard, such as WiFi, 2G, or 3G, or a combination thereof. In one exemplary embodiment, the communication component 616 receives a broadcast signal or broadcast information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and/or other technologies.

In exemplary embodiments, the terminal device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the terminal device 600, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for accessing a base station, comprising:
   identifying, by a terminal device, a target base station providing a maximum received signal strength from at least one base station;
   receiving a system message sent by the target base station, the system message including a plurality of access parameters associated with the target base station, wherein the plurality of access parameters comprise a minimum access level, reselection offset information, an update period, a General Packet Radio Service (GPRS) supporting status, and a Location Area Code (LAC) identification;
   determining a security factor corresponding to the target base station according to a matching degree between a value of each access parameter and a pre-stored reference value, wherein determining a security factor corresponding to the target base station comprises:
      acquiring a pre-stored reference value of each access parameter of the plurality of access parameters;
      determining a matching degree between the value of each access parameter and a corresponding reference value;
      determining an adjustment value corresponding to each access parameter according to a pre-stored corresponding relationship between the matching degree and the adjustment value; and
      determining a sum value of a pre-stored initial value and the adjustment value corresponding to each access parameter as the security factor corresponding to the target base station;
   if the security factor is less than a preset threshold value, accessing the target base station; and
   if the security factor is not less than the preset threshold value, maintaining access to a base station currently accessed by the terminal device.

2. The method of claim 1, wherein identifying the target base station comprises:
   identifying the target base station from at least one base station not included in a pre-stored list of one or more prohibited base stations.

3. The method of claim 1, wherein the system message includes a System Information Block Type3 (SIB3) message.

4. An apparatus for accessing a base station, comprising:
   a processor; and
   a non-transitory memory for storing instructions executable by the processor;
   wherein the processor is configured to:
      identify a target base station providing a maximum received signal strength from at least one base station;
      receive a system message sent by the target base station, the system message including a plurality of access parameters associated with the target base station, wherein the plurality of access parameters comprise a minimum access level, reselection offset information, an update period, a General Packet Radio Service (GPRS) supporting status, and a Location Area Code (LAC) identification;
      determine a security factor corresponding to the target base station according to a matching degree between a value of each access parameter and a pre-stored reference value, wherein in determining a security factor corresponding to the target base station the processor is configured to:
         acquire a pre-stored reference value of each access parameter of the plurality of access parameters;
         determine a matching degree between the value of each access parameter and a corresponding reference value;
         determine an adjustment value corresponding to each access parameter according to a pre-stored corresponding relationship between the matching degree and the adjustment value; and
         determine a sum value of a pre-stored initial value and the adjustment value corresponding to each access parameter as the security factor corresponding to the target base station;
      if the security factor is less than a preset threshold value, access the target base station; and
      if the security factor is not less than the preset threshold value, maintain access to a base station currently accessed by the apparatus.

5. The apparatus of claim 4, wherein the processor is further configured to:
   identify the target base station from at least one base station not included in a pre-stored list of one or more prohibited base stations.

6. The apparatus of claim 4, wherein the system message includes a System Information Block Type 3 (SIB3) message.

7. A non-transitory readable storage medium storing instructions that, when executed by a processor in a terminal device, cause the terminal device to perform a method for accessing a base station, the method comprising:
   identifying, from at least one base station, a target base station providing a maximum received signal strength to the terminal device;
   receiving a system message sent by the target base station, the system message including a plurality of access parameters associated with the target base station, wherein the plurality of access parameters comprise a minimum access level, reselection offset information, an update period, a General Packet Radio Service (GPRS) supporting status, and a Location Area Code (LAC) identification;
   determining a security factor corresponding to the target base station according to a matching degree between a value of each access parameter and a pre-stored reference value, wherein determining a security factor corresponding to the target base station comprises:
      acquiring a pre-stored reference value of each access parameter of the plurality of access parameters;
      determining a matching degree between the value of each access parameter and a corresponding reference value;
      determining an adjustment value corresponding to each access parameter according to a pre-stored corresponding relationship between the matching degree and the adjustment value; and
      determining a sum value of a pre-stored initial value and the adjustment value corresponding to each access parameter as the security factor corresponding to the target base station;

if the security factor is less than a preset threshold value, accessing the target base station; and if the security factor is not less than the preset threshold value, maintaining access to a base station currently accessed by the terminal device.

* * * * *